Figure 1:
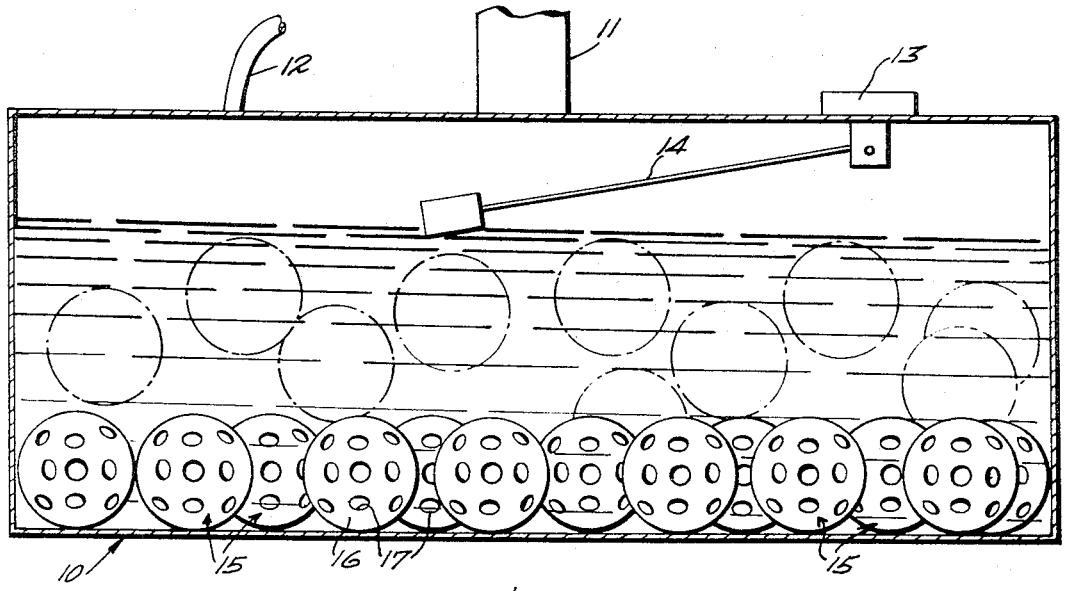

United States Patent [19]
Pollack

[11] 3,784,050
[45] Jan. 8, 1974

[54] FLOATING BAFFLE SYSTEM FOR FUEL TANKS

[75] Inventor: Melvin Pollack, Coral Gables, Fla.

[73] Assignee: Apeco Corporation, Evanston, Fla.

[22] Filed: Oct. 26, 1971

[21] Appl. No.: 192,044

[52] U.S. Cl................................ 220/85, 220/26
[51] Int. Cl............................................ B65d 25/00
[58] Field of Search................ 220/88 R, 26, 85; 138/27; 259/4; 206/46 FC

[56] References Cited
UNITED STATES PATENTS
3,349,953  10/1967  Conaway et al. ............. 220/88 R X
3,687,329  8/1972  Baum............................ 220/88 R X Primary Examiner—William T. Dixson, Jr.
Assistant Examiner—Steven M. Pollard
Attorney—Ernest H. Schmidt

[57] ABSTRACT

A floating baffle system for dampening the liquid fuel in fuel tanks supplying vehicular engines is described. A plurality of hollow, thin-walled, three-dimensional perforate objects of a tough, semi-rigid, somewhat resilient material are contained within the tank to be churned up and more or less uniformly distributed within the fluid fuel upon agitation of the tank in use, whereupon they act as individual baffle members dampening fluid flow not only by baffle action, but also by absorbing kinetic energy within the fluid by their reactive collision with one another.

3 Claims, 2 Drawing Figures

PATENTED JAN 8 1974   3,784,050

INVENTOR.
MELVIN POLLACK

BY Ernest H. Schmidt

ATTORNEY.

FLOATING BAFFLE SYSTEM FOR FUEL TANKS

This invention relates to fuel tanks, and is directed particularly to fuel tanks for vehicular proplusion motors used in automobiles, water craft and aircraft.

Since the liquid fuel in a vehicular fuel tank is in a constant state of motion while the vehicle is moving, the tank is subject to kinetic stresses that must be taken into account in its design. This is particularly true in the design of gasoline tanks for marine motors used in pleasure craft. In such installations, the continuous up and down movement of the craft while under way effects substantial oscillatory pounding of the fuel in the tank, particularily if the tank is about half full. In time, metal fatigue in concentrated stress zones of the tank may result in hair-line cracks permitting seepage of the fuel. In marine gasoline tanks, such leakage is apt to result in gasoline vapor settling in the bottom of the boat hull, which is, of course, extremely hazardous because of the possibility of explosion. In order to reduce the motion of the fuel, and thereby reduce the stresses imposed upon the walls of such tanks, it is been common practice to provide the interior of the tank with one or more rigid, perforate partitions which, while allowing for the through flow of the contained fuel, serve as baffles to dampen the side-to-side, and/or end-to-end flow in the tank, thereby minimizing the build-up of kinetic energy in the fuel. While such rigid baffles are effective in reducing internal stresses due to fuel pounding, they are deficient in several respects, principally in that they add substantially to the cost of the tank, and in that the free space requirements of internal float arms and the like associated with fuel gages and other instrumentation limits optimum placement of baffles in the tank.

It is a more particular object of this invention to provide a floating baffle system for liquid fuel tanks wherin a plurality free-floating, perforate, hollow, three-dimensional baffle members interact by colliding with one another upon movement of the fuel within the tank, thereby absorbing, for the most part, the kinetic energy imparted to the fuel upon movement of the tank to substantially reduce stresses which might otherwise be imposed upon interior wall portions of the tank.

Yet another of the invention is to provide a fuel tank floating baffle system of the character described wherein the floating baffle members are in the form of a perforate, spherical shell made of a tough semi-rigid material of sufficant resiliency as to provide for spring-like reaction upon their inter-colliding abuttment with one another.

It is still another object of the invention to provide a baffle system for fuel tanks which will be inexpensive to manufacture, long wearing in use, and extraordinarily effective in reducing metal fatigue leakage in fuel tanks due to fluid motion in the tank.

Other objects, features, and advantages of the invention will be apparent from the following description when read with references to the accompanying drawings. In the drawings, wherein like reference numerals denote corresponding parts throughout the several views FIG. 1 is a vertical cross-sectional view of a typical marine motor gasoline tank equipped with a preferred form of floating baffle system embodying the invention; and FIG. 2 is a vertical cross-sectional view of one of the floating baffle members of the system show in FIG. 1

Figure 2:
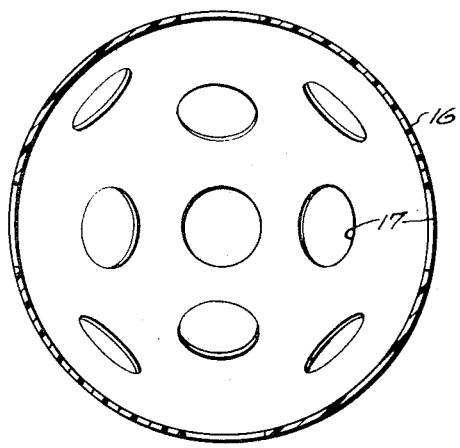

Referring now in detail to the drawings, reference numeral 10 in FIG. 1 designates, by way of example, a typical sheet metal gasoline tank of the type used for supplying fuel to a marine engine. Although the tank is illustrated as being elongated in the horizontal direction, it will be understood that the invention is as well adapted to use with vertically elongated tanks, as well as with tanks of various cross-section, whether curved, rectangular or polygonal in cross-sectonal shape. The tank 10 is shown with the usual filler pipe 11, (partcially illustrated), vent pipe 12, (also partcially illustrated), and fuel gage 13 having an interior float arm 14. Enclosed within the tank 10 are a plurality of three-dimentional float members 15, each of which is in the form of a thin-walled spherical shell 16 provided with a plurality of uniformly destributed ciricular openings 17. The baffle members 15 are fabricated of a tough, resilient, semi-rigid material, preferably of a synthetic plastic material such as polypropelene. It is been determined that in gasoline tanks having a fuel capacity of between fifteen and sixty gallons, four inch diameter baffle members 15 in ratios of between two and three of said baffle members for each cubic foot of tank capacity is particularly effective in dampening fluid motion of the fuel.

In the operation of my floating baffle system, the baffle members 15, which preferably will be of a material having a density only slightly greater then that of the contained fuel, will rest on the bottom of the tank under quiet-state fuel conditions. As soon as the fuel becomes even slightly agitated, due to motion of the associated vehicle, the baffle members 15, will be churned upwardly to distribute themselves more or less uniformrly throughout the fuel, as illustrated by the broken-line representation thereof in FIG. 1. The greater of the agitation of the fuel, the more evenly will the floating baffle members 15 be distributed, to act as individual baffles having a dampening effect upon fluid flow throughout the tank in all directions. It is further to be noted that, because of their resiliency, the baffle members 15 not only afford dampening by baffle action as described above, but also enhance dampening by their resilient interaction upon colliding with one another. A substantial portion of the kinetic energy which may be induced in the contained fuel due to motion of the tank is thus absorbed in the frictional interaction between the baffle members.

Because of the free-floating nature of the individual baffle members 15 as described above, they will float to one side or the other of the float arm 14 where it meets the surface of the contained fuel, thereby offering no impediment to the proper swinging motion of said float arm, no matter what its placement and arc of movement within the tank.

It is further contemplated that the floating baffle members 15 incorporate in the material of which they are manufactured, a chemical agent that, at high temperatures, will melt and give off sufficient volumes of non-cumbustable gas such as carbon dioxide as will inhibit explosion of a fuel-containing tank due to intense heat in case of fire aboard ship.

While I have illustrated and described her in only one form in which my invention can conveniently be embodied in practice, it is to be understood that this embodiment is given by way of example only and not in a limiting sense. For example, while I have illustrated and described the baffle members 15 as being of spherical shape, they could also be of other three-dimensional shapes, without departing from the invention. It is also to be understood that, although I have illustrated and described the fuel tank without rigid interior baffle plates, my floating baffle system could also be used in conjunction with such ordinary baffle plates, if desired, without departing from the invention. The invention, in brief, comprises all the embodiments and modifications coming within the scope and spirit of the following claims.

What I claim as new and desire to secure by Letters Patnet is:

1. A floating baffle system for vehicular fuel tanks containing gasoline or the like engine fuels comprising, a tank member defining an interior chamber for holding the liquid fuel, a plurality of three-dimensional, thin-walled, perforated baffle members disposed and freely movable within said tank member, said baffle members being fabricated of a semi-rigid resilient material and having a specific density somewhat greater than that of the fuel in the tank so as to rest on the bottom of the tank under quiet-state fuel conditions.

2. A floating baffle system for fuel tanks as defined in claim 1 wherein said baffle members are of spherical shape.

3. A floating baffle system for fuel tanks as defined in claim 1 wherein, in tank members having a capacity within the range of fifteen to sixty gallons, the quantity of said baffles within the tank is in the ratio of between two and three thereof for each cubic foot of tank capacity.

* * * * *